United States Patent [19]

Motoda et al.

[11] Patent Number: 5,065,522
[45] Date of Patent: Nov. 19, 1991

[54] METHOD OF DETECTING VERTICALITY, DETECTOR THREREFOR AND LEVEL MAINTAINING BASE WHICH EMPLOYS SAID DETECTOR AND WHICH ACTS TO MOUNT MECHANISM OR APPARATUS

[75] Inventors: Kenro Motoda; Hirosuke Isoe, both of Tokyo, Japan

[73] Assignee: Motoda Electronics, Co. Ltd., Tokyo, Japan

[21] Appl. No.: 593,967

[22] Filed: Oct. 9, 1990

[30] Foreign Application Priority Data

Oct. 17, 1989 [JP] Japan .................................. 1-268172
Jul. 20, 1990 [JP] Japan .................................. 2-190428

[51] Int. Cl.⁵ .............................................. G01C 9/14
[52] U.S. Cl. ........................................ 33.1/366; 33/394; 33/391
[58] Field of Search .......... 33/366, 365, 370, 391–394, 33/397, 398, 401, 402

[56] References Cited

U.S. PATENT DOCUMENTS

| | | | |
|---|---|---|---|
| 2,491,334 | 12/1949 | Reeves | 33/370 |
| 2,510,610 | 6/1950 | Twist | 33/370 |
| 2,876,672 | 3/1959 | Buckley et al. | 33/392 |
| 2,916,916 | 12/1959 | Holsclaw | 33/370 |
| 3,277,840 | 10/1966 | Li | 33/365 |
| 3,935,643 | 2/1976 | Russell et al. | 33/366 |
| 4,302,962 | 12/1981 | Williams | 33/365 |
| 4,370,813 | 2/1983 | Burniski | 33/366 |
| 4,401,888 | 8/1983 | West et al. | 33/366 |
| 4,700,479 | 10/1987 | Saito et al. | 33/366 |
| 4,949,467 | 8/1990 | Oman et al. | 33/366 |

Primary Examiner—William A. Cuchlinski, Jr.
Assistant Examiner—C. W. Fulton
Attorney, Agent, or Firm—Rogers & Killeen

[57] ABSTRACT

A method of detecting the verticality, a detector therefor and a level maintaining base for a mechanism and an apparatus which employs the above-described detector are disclosed. The method of detecting vertically comprising the steps of: hanging a weight from a reference member disposed along the vertical axis in a state where the weight can be freely swung forwards and rearwards and right and left and in the direction of the intersection on the plane; detecting, in the direction of swinging of the weight, the state where the weight is swung when the weight is freely swung, the state being detected by proper detection means such as electric, magnetic and optical detection means; and analyzing a detection signal denoting the detected direction of the swing, whereby the inclination of the reference member with respect to the vertical axis is detected.

19 Claims, 9 Drawing Sheets

METHOD OF DETECTING VERTICALITY, DETECTOR THREREFOR AND LEVEL MAINTAINING BASE WHICH EMPLOYS SAID DETECTOR AND WHICH ACTS TO MOUNT MECHANISM OR APPARATUS

BACKGROUND OF THE INVENTION

1. Field of the Invention

The present invention relates to a method of detecting the verticality, a detector therefore and a level maintaining base which employs the above-described detector and which acts to mount a mechanism or an apparatus which must be placed while making a predetermined angle with respect to the horizontal plane or the vertical axis, for example, must be placed perfectly horizontally or vertically. Furthermore, the present invention relates to a method of detecting the verticality, a detector therefor and a level maintaining base which employs the above-described detector and which acts to mount a mechanism or an apparatus whereby an inclined plane of a desired angular degree with respect to the horizontal plane can be always automatically obtained even if the mounting surface is always changed or swung randomly.

2. Description of the Related Art

There have been a variety of methods and detectors capable of detecting the verticality.

If a subject, the verticality of which is desired to be detected, is stably and fixedly placed, its verticality can be detected satisfactorily by suspending a weight with a piece of string.

However, in the case where the subject the verticality of which is desired to be detected is a movable type, for example, a movable body, a critical technical problem arises when its verticality is desired to be quantitatively detected similarly to the case of the stable subject. Therefore, a verticality detector capable of detecting the verticality of a movable subject encounters a problem in that its structure becomes too complicated and the overall cost cannot be reduced.

Hitherto, in order to perfectly horizontally place a precise machine or a measuring equipment, an adjuster has been employed for the purpose of adjusting the levelness.

An adjuster of the type described above is arranged in such a manner that screw-type legs are provided for the four corners of the bottom surface of the device frame and those legs are forwards/rearwards rotated so that the levelness of the device frame is realized.

Furthermore, a desire has been arisen in that a mechanism or an apparatus to be mounted on a surface the angle of which may be changed must be always placed horizontally or capable of always following the horizontal plane while making a predetermined angle of inclination regardless of the existence of the displacement of the mounting surface. However, the conventional structures have not satisfactorily meet the above-described desire as yet.

SUMMARY OF THE INVENTION

Accordingly, an object of the present invention is to provide a detector capable of stably, quatitatively, quickly and accurately detecting the verticality of a movable subject even if the detector is fastened to that movable subject such as an erected support pole, a machine, a mechanism and an apparatus which can be moved or swung. Furthermore, another object of the present invention is to provide a verticality detector exhibiting the above-described detection performance with a simple structure and a reduced cost. Furthermore, another object of the present invention is to provide a level maintaining base which employs the above-described detector.

In order to achieve the above-described objects, according to an aspect of the present invention, there is provided a method of detecting verticality comprising the steps of: hanging a weight from a reference member disposed along the vertical axis in a state where the weight can be freely swung forwards and rearwards and right and left and in the direction of the intersection on the plane; detecting, in the direction of swinging of the weight, the state where the weight is swung when the weight is freely swung, the state being detected by proper detection means such as electric, magnetic and optical detection means; and analyzing a detection signal denoting the detected direction of the swing, whereby the inclination of the reference member with respect to the vertical axis is detected.

According to another aspect of the present invention, there is provided a verticality detector comprising: longitudinally disposed cylindrical main body serving as a reference member; a weight capable of freely swung forwards and rearwards and right and left and in the direction of the intersection on the plane is hung in the cylindrical main body via a suspension support body; and detection means for electrically, magnetically or optically detecting swinging of the weight in the direction of swinging of the weight.

According to another aspect of the present invention, there is provided a level maintaining base for a mechanism or an apparatus comprising: a base member on which a proper mechanism or an apparatus are mounted and end portions of which are supported via a horizontal first shaft and a horizontal second shaft disposed perpendicularly to the first shaft in such a manner that the base member can be swung relative to the two shafts; third and fourth shafts capable of moving upwards/downwards and arranged to support another end portions of the base member; and the detector arranged to detect the verticality, the levelness or the degree of inclination of the base member, the detector being provided for the base member while using the base member to act as a reference plane, wherein the operations of the first and second shafts and those of the third and fourth shaft are controlled in accordance with the result of a calculation of the detection output from the detection sensor of the detector.

A weight, hung from a reference member such as a cylindrical main body in such a manner that the weight can be freely swung in at least the direction of intersection on the plane, commences swinging at the precise moment the main body is inclined in any direction. Thus started free swinging causes a vibration state to be realized.

Therefore, the thus realized vibration state is detected by detection means, for example, an electric signal device, disposed so as to correspond to the direction of swinging of the weight. Then, the detection signal is analyzed so that the direction and the degree of the inclination of the cylindrical main body are detected.

The level maintaining base is arranged in such a manner that the two end portions of the base member on which a mechanism or an apparatus is mounted are supported by the first shaft and the fourth shaft, respectively. Furthermore, the detector is provided for the above-described base member while making the base member to serve as the reference plane. As a result, the base member can vary its attitude at optional angular degrees with respect to the vertical axis or the horizontal axis in a range from a zero degree to a predetermined angular degree. Furthermore, the base member can maintain its attitude at a predetermined angular degree.

Other and further objects, features and advantages of the invention will be apparent to those skilled in the art from the following description.

DESCRIPTION OF THE PREFERRED EMBODIMENTS

Preferred embodiments of the present invention will now be described with reference to the drawings.

Figure 1:
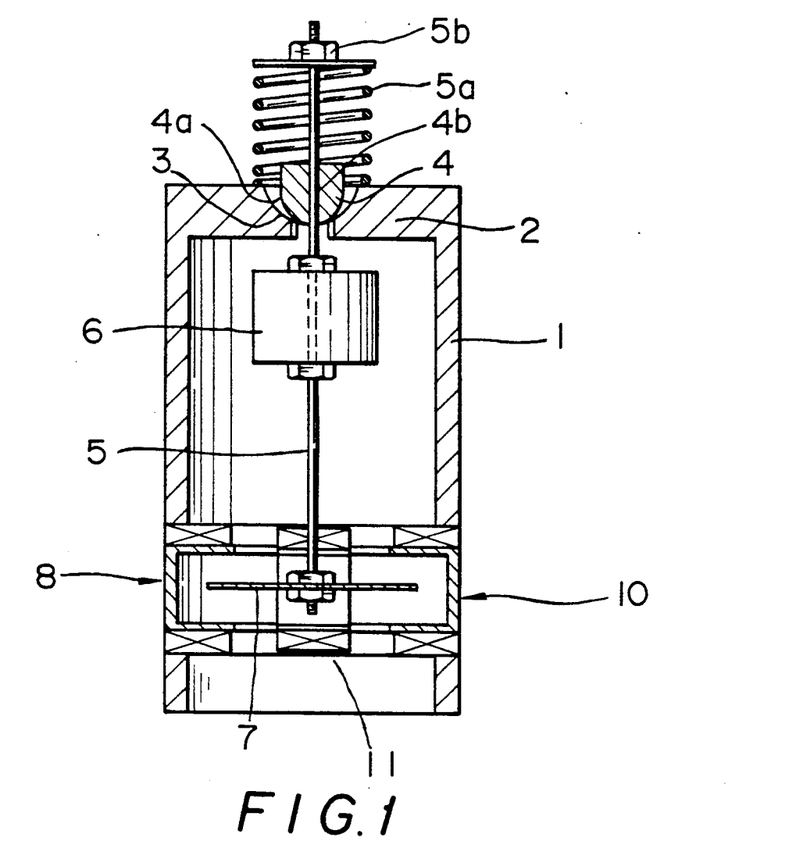
FIG. 1 is a vertical cross sectional view which illustrates the main body of an embodiment of a detector according to the present invention.

Referring to FIG. 1, reference numeral 1 represents a cylindrical main body serving as the reference member of a detector VS according to the present invention. Reference numeral 2 represents a ceiling member for the main body 1, the ceiling member 2 having, in the central portion thereof, a tapered hole which serves as a bearer 3. The bearer 3 may be in the form of another shape, for example, a hole having a concave surface.

Reference numeral 4 represents a support member for supporting a suspension rod 5, the support member 4 having a spherical lower portion 4a. The suspension rod 5 supports a weight 6 in a suspended manner, the upper portion thereof being inserted into a hole 4b formed in the central portion of the support member 4. A coil spring 5a and a spring retaining nut 5b are provided for the insertion portion. The spring 5a acts to reduce the friction generated due to the weight 6.

The length of the lower portion of the suspension rod 5 is arranged to be sufficient to project over the lower end of the cylindrical main body 1. Furthermore, the weight 6 is fastened to a position higher than the intermediate position of the suspension rod 5 in such a manner that the weight 6 can be moved vertically.

The vertical positional adjustment of the weight 6 is achieved, for example, by male and female screws provided for the suspension rod 5 and the weight 6 respectively or by a structure arranged in such a manner that the weight 6 is movably fastened to the suspension rod 5 and they are fixed by a fixing screw or the like. The weight 6 is fixed after its vibrational frequency has been adjusted. When the weight 6 is positioned in the relatively upper portion of the suspension rod 5, that is, in the vicinity of the supporting point, the vibrational frequency is raised and the accuracy in detection can thereby be improved.

As a result of the above-described structure comprising the above-described components 1 to 6, the weight 6 is suspended and supported by the suspension rod 5 in such a manner that it can move in all directions on the plane by the action of the bearer 3 and the support member 4.

However, the present invention is not limited to the above-described structure with which the weight 6 is freely swung and vibrated on the plane. Another structure may be employed. Since the weight 6 is supported in such a manner that it can be swung freely, the weight 6 is swung continuously when the cylindrical main body 1 is inclined slightly, that is, vibrated. Therefore, if the start of the swing can be detected, the generation of the inclination can be detected.

However, if the weight 6 has commenced its swinging back and forth and a vibrational state has been realized due to continuance of the swinging, the vibration is detected by the front and rear detection means. Therefore, the side on which the inclination of the cylindrical main body 1 has been generated and the degree of the inclination cannot easily be detected and discriminated.

According to the present invention, the generation, the direction and the degree of the inclination can be quickly and accurately detected with a simple structure even if the above-described type of vibrations have generated.

Then, the structure will be described.

Reference numeral 7 represents a flat light shielding plate fastened to the lower end of the suspension rod 5, the light shielding plate 7 being formed rectangularly when viewed in a plan view. Reference numerals 8, 9, 10 and 11 respectively represent detection means comprising, for example, photo-interrupters and fastened to the lower end of the cylindrical main body 1 which serves as the reference member, the detection means 8, 9, 10 and 11 being disposed so as to vertically hold the respective sides of the light shield plate 7. It is preferable that the light shielding plate 7 and the detection means 8 to 11 be disposed to the lower end portion of the suspension rod 5 as much as possible in order to accurately detect an inclination of a small degree.

The detection means 8 to 11 do not generate a signal when the cylindrical main body 1 is positioned vertically, that is, when both the main body 1 and the suspension rod 5 are placed vertically. If the cylindrical main body 1 is inclined, for example, to the left, a signal is generated on the light receipt side of the photo-interrupter which serves as the detection means 10. If the cylindrical main body 1 is inclined to the intermediate portion between the detection means 8 and 9, that is, inclined diagonally, two detection means, which are positioned correspondently and respectively, generate the signals.

Figure 2:
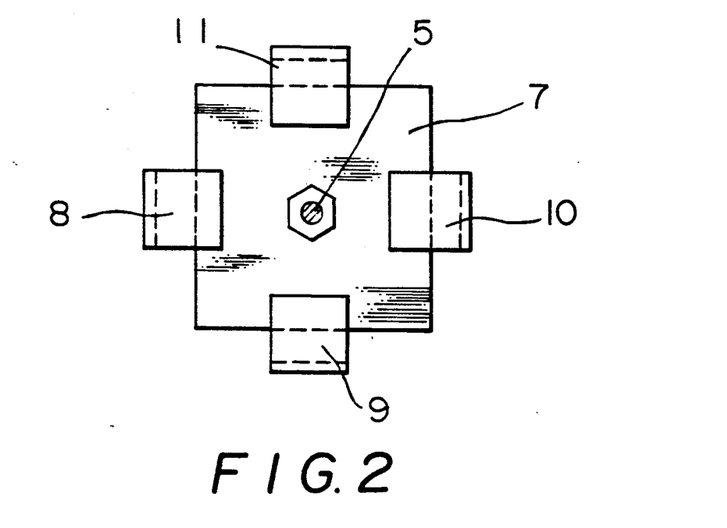
FIG. 2 is a plan view which illustrates an example of the configuration of detection means according to the present invention.

Therefore, when the positional relationships between the light shield plate 7 and the detection means 8 to 11 are arranged as shown in FIG. 2 which is a plan view, the output from the detection means 8 denotes the right inclination of the cylindrical main body 1 which serves as the reference member. Similarly, the output from the detection means 9 denotes the forward inclination (inclination toward the opposite side) of the main body 1. The output from the detection means 10 denotes the left inclination of the main body 1, while the output from the detection means 11 denotes the rearward inclination (inclination toward this side) of the main body 1. Furthermore, the simultaneous outputs from the detection means 8 and 9, 9 and 10, 10 and 11, or 11 and 8 respectively denote the diagonally back and forth or diagonally right and left inclination.

Therefore, if the detection means which has transmitted the first output can be discriminated from the the detection means 8 to 11, the direction of the initial inclination of the cylindrical main body 1 with respect to the vertical axis can be determined. Therefore, the detector according to the present invention can satisfactorily serve as a verticality detector by virtue of the above-described function. It is preferable that the structure be arranged in such a manner that the confronting detection means 8 and 10 and the confronting detection means 9 and 11 are so positioned with respect to the light shield plate 7 that a small angular inclination of the cylindrical main body 1, for example, one degree, is not detected. That is, it is preferable that an insensitive zone be provided as an alternative to the structure arranged in such a manner that, when a precise inclination of the cylindrical main body 1 is generated, a signal denoting that inclination is immediately detected.

The reason for this lies in that, if the sensitivity against the inclination is excessively raised, a so-called "chattering" takes place in the output from the detection means, causing the inclination detection to become difficult.

Then, the description will be made below about a structure to be fastened to a subject which is moved or a subject which is inclined from a stable state and so as to quickly and accurately detect the verticality of the subject because it is the object of the present invention.

The above-described verticality detector VS is arranged in such a manner that, if the subject to which the detector VS is attached is inclined, the swinging of the suspension rod 5 due to the movement or the like of the subject becomes continuous vibrations because the suspension rod 5, to which the weight 6 is fastened, is borne by the bearer 3 at the fastening member 4 thereof in such a manner that the fastening member 4 can be freely swung with respect to the bearer 3.

Figure 3A:
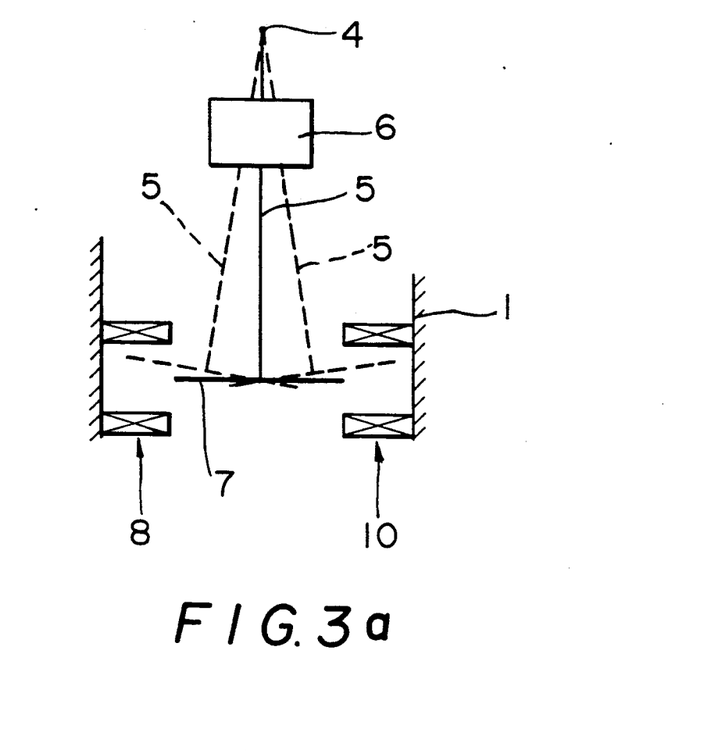
FIG. 3A is a schematic view which illustrates an example of the relationship between a suspension rod, a weight and the detection means in the vertical state.
Figure 3B:
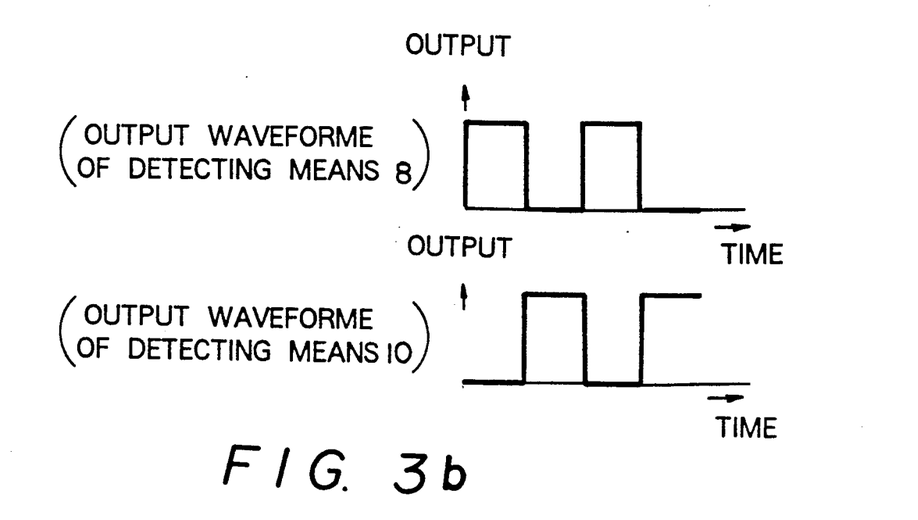
FIG. 3B illustrates a waveform of an output from the detection means in the state shown in FIG. 3A.

Assuming that the cylindrical main body 1 which serves as the reference member is not inclined with respect to the vertical axis (see FIG. 3A), the signals generated due to the vibration of the weight 6 and detected by, for example, the detection means 8 and 10 display the substantially same level as can be seen from FIG. 3B.

Figure 4A:
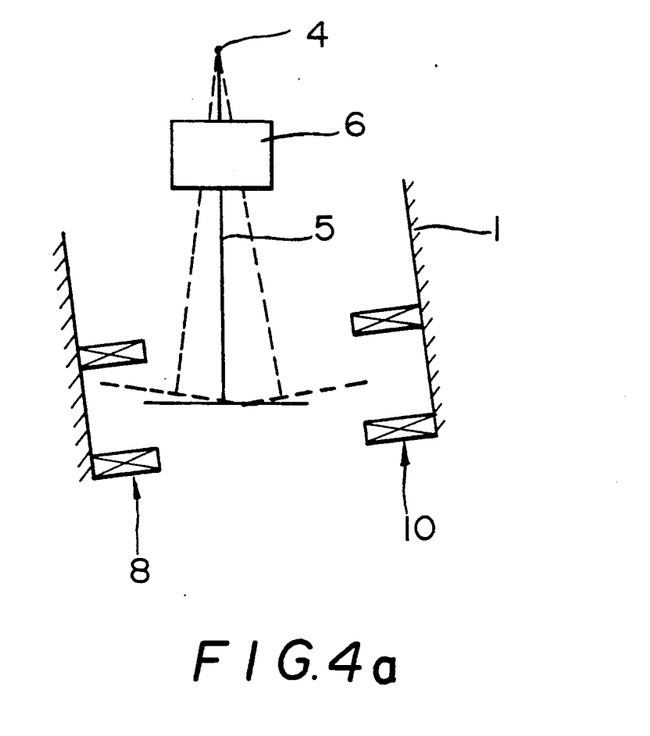
FIG. 4A is a schematic view which illustrates an example of the relationship between the suspension rod, the weight and the detection means in an inclined state.
Figure 4B:
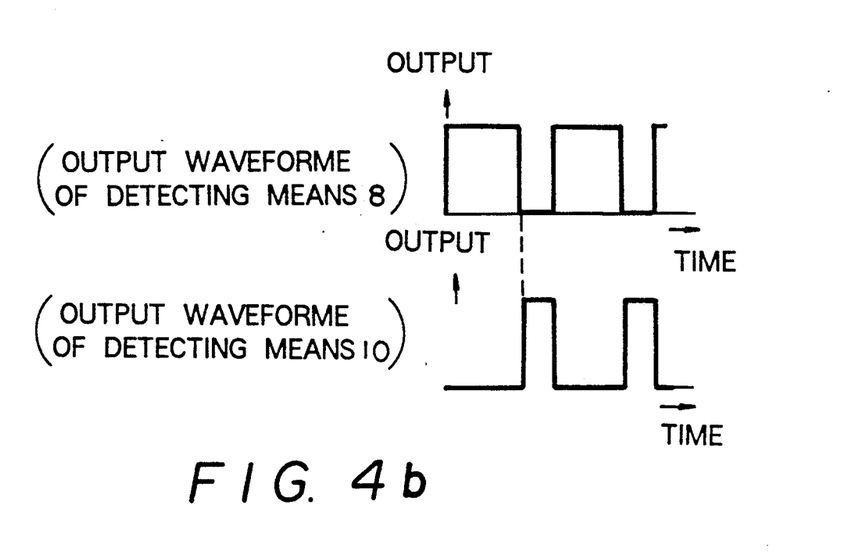
FIG. 4B illustrates a waveform of an output from the detection means in the state shown in FIG. 4A.

However, if the swinging of the suspension rod 5 is continued with the cylindrical body 1, which is the reference member, inclined with respect to the vertical axis(see FIG. 4A), the detection means positioned in the direction along the above-described swinging operation, for example, the detection means 8 and 10, transmit the different detection outputs as is shown from FIG. 4B.

Therefore, according to the present invention, a structure is arranged in such a manner that the time periods in which the outputs can be obtained from the above-described detection means 8 and 10 are measured so as to subject the time periods to a comparison. As an alternative to this, a structure is arranged in such a manner that the detection outputs from the detection means 8 and 10 are obtained in the form of pulse signals so as to subject the pulse signals to a comparison. As a result, the inclination of the subject toward the detection means 8 or 10, that is, the direction of the inclination is detected. Furthermore, the degree of the inclination is detected by measuring and calculating the output (the area of the waveform or the number of pulses) from the detection means 8 per a unit time.

According to the present invention, the inclination insensitive zone which is able to act even if the weight is being vibrated can be realized as follows.

That is, the weight 6 sometimes freely swings due to the action of the subject to which the cylindrical main body 1 is fastened if the cylindrical main body 1 is not inclined with respect to the vertical axis. In this case, the detection means 8, 10 and 9, 11, which are disposed along the direction of the above-described swinging action, transmit the substantially same detection outputs.

Therefore, the difference in the detection output, between the pair of the detection means 8 and 10 and the pair of the detection means 9 and 11, is always recognized. so that a neutral zone or the insensitive zone in which the cylindrical main body 1 is not inclined is established when there is no deflection (or within a predetermined degree of the deflection). If a deflection between the outputs from the two pairs of the detection means is detected, it is determined that the cylindrical main body 1 is inclined in the corresponding direction. In the structure in which each of the photo-interrupters serving as the detection means 8 to 11 is a type having the light emitting portion which applies pulse wave light to the light receipt portion, its detection output is obtained in the form of a pulse wave. The detection sensitivity or the detection accuracy of the detection means of the type described above can be optionally adjusted by modulating the frequency of emitted light from the light emitting portion.

The detection means for obtaining the above-described output may be replaced by a magnetic encoder.

Figure 5:
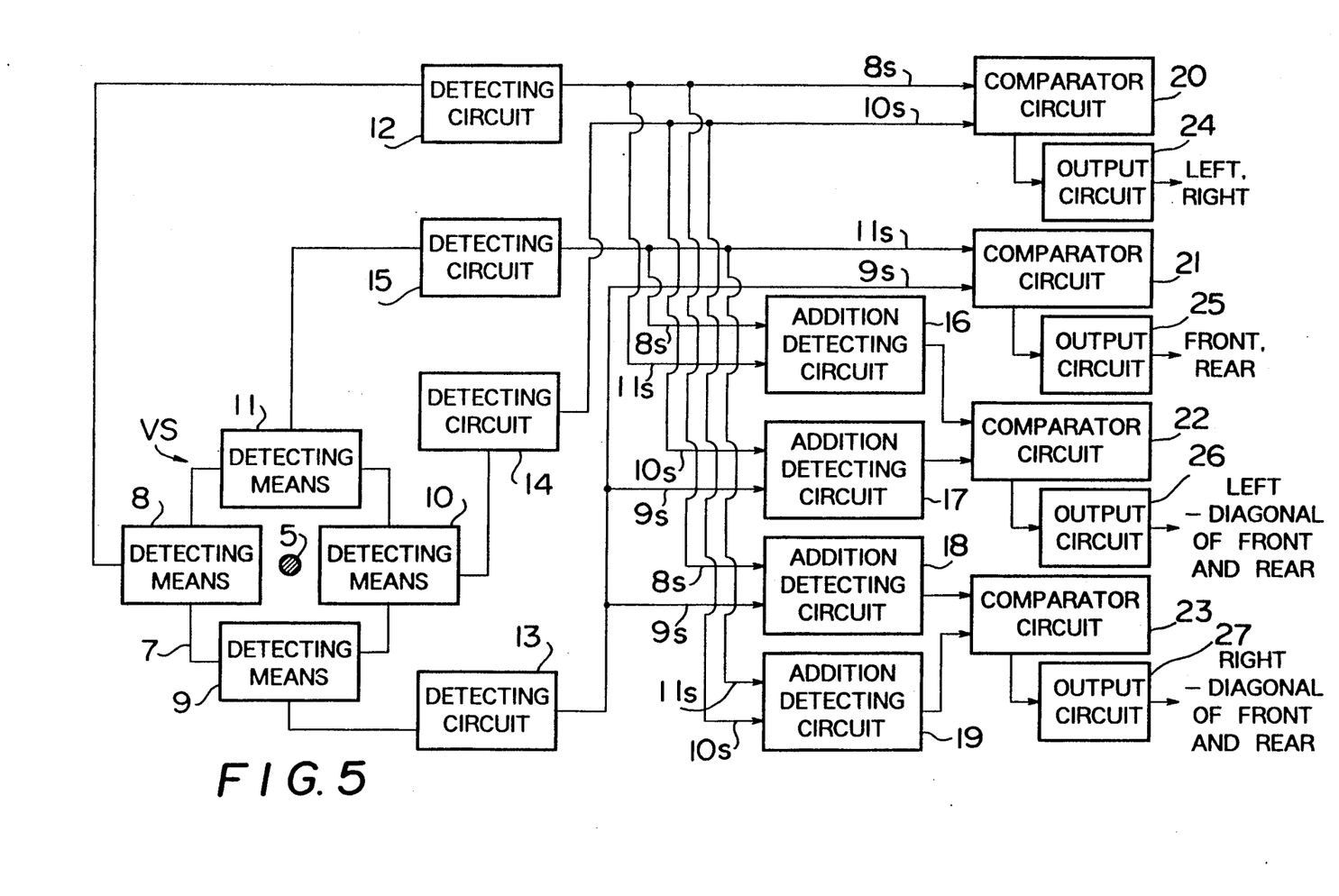
FIG. 5 is a functional block diagram which illustrates an example of a portion for Processing a detection output.

FIG. 5 is a functional block diagram which illustrates an example of a portion for processing the output signals from the respective detection means 8 to 11.

Referring to FIG. 5, reference numerals 12 to 15 respectively represent detection circuits connected to the corresponding detection means 8 to 11. the detection circuits 12 to 15 comprising circuits for measuring, by clock pulses, the time in which the detection means 8 to 11 transmit the outputs 8s to 11s and counter circuits for counting the number of the pulses of the outputs 8s to 11s from the detection means 8 to 11. Reference numerals 16 to 19 respectively represent detection arithmetic circuits for adding the outputs from the detection circuits 12 to 15 of two detection means of the detection means 8 to 11 in the case where the two detection means simultaneously transmit the outputs. Each of the detection arithmetic circuits 16 to 19 respectively has a gate (omitted from illustration) which is not operated if there is no input from the two detection means.

Reference numerals 20 to 23 respectively represent comparison circuits for comparing detection outputs from the detection means 8 to 11 of the corresponding detection circuits 12 to 15 and 16 to 19. The comparison circuits 20 to 23 calculate the differences in the detected values obtained by the detection circuits 12 to 15 or 16 to 19. The thus obtained values are converted into signals denoting the angles in the ensuing output circuits 24 to 27 before the signals are transmitted. As a result, the detector VS according to the present invention can serve as a level because the angular degree and the direction of the inclination with respect to the vertical axis can be detected as numerical data.

The present invention is not limited to the above-described method for processing the outputs from the detection means 8 to 11. However, the outputs from the output circuits 24 to 27 must be similarly processed in the processing portion.

Figure 6:
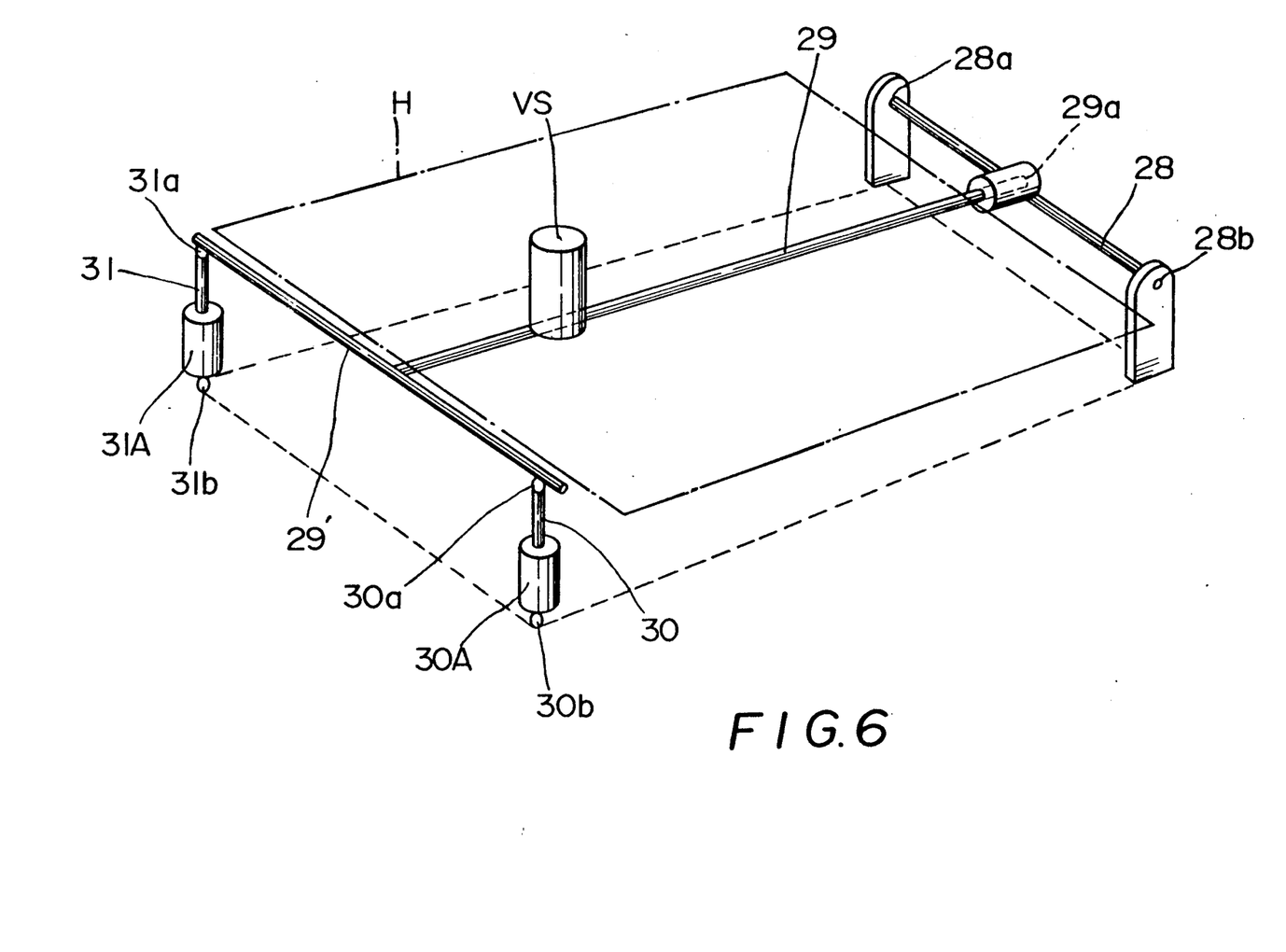
FIG. 6 is a perspective view which illustrates, in a skeleton manner, a level maintaining base for a mechanism and an apparatus in which the detector according to the present invention is employed.

The above-described verticality detector VS according to the present invention can be included so as to constitute a level maintaining base for a mechanism and an apparatus as shown in FIG. 6.

That is, referring to FIG. 6, reference numeral 28 represents a horizontal first shaft which is, according to this embodiment, disposed toward the opposite side of the drawing. Reference numerals 28a and 28b represent bearings for bearing the first shaft 28 at the two ends of the first shaft 28.

Reference numeral 29 represents a second shaft disposed horizontally and perpendicularly to the first shaft 28 at the intermediate position of the first shaft 28. The rear end (the right side of the drawing) of the second shaft 29 is, on the first shaft 28, rotatably supported by a bearing 29a.

The forward end (the left side of the drawing) of the second shaft 29 has a support shaft 29' disposed perpendicularly to the second shaft 29, that is disposed in parallel to the first shaft 28. The two ends of the support shaft 29' are supported by a third shaft 30 and a fourth shaft 31 which are disposed in substantially parallel to the vertical axis.

The third and the fourth shafts 30 and 31 are respectively arranged in such a manner that they can be lifted vertically by stroke actuators 30A and 31A comprising a motor cylinder, an air cylinder and a screw driving mechanism. As a result, the support shaft 29' and the second shaft 29, that is, the plane including the two shafts 29 and 29' can be held while making an optional inclination angle containing a zero degree with respect to the vertical axis or the horizontal plane which is perpendicular to the vertical axis by the elevational action of the actuator 30A and/or the actuator 31A.

Joint portions 30a and 31a between the upper ends of the two actuators 30A and 31A. and the support shaft 29' and ground portions 30b and 31b opposite to the above-described upper ends are formed by universal joints.

As a result, an example of the level maintaining base according to the present invention can be formed so that it includes the above-described verticality detector (VS). Therefore, the inclination of reference plane H formed by the plane including the second shaft 29 and the support shaft 29' with respect to the vertical axis is always detected. As a result, the above-described actuators 30A and 31A are, as will be described later, operated in such a manner that the reference horizontal plane H is always positioned horizontally with respect to the vertical axis.

Figure 7A:
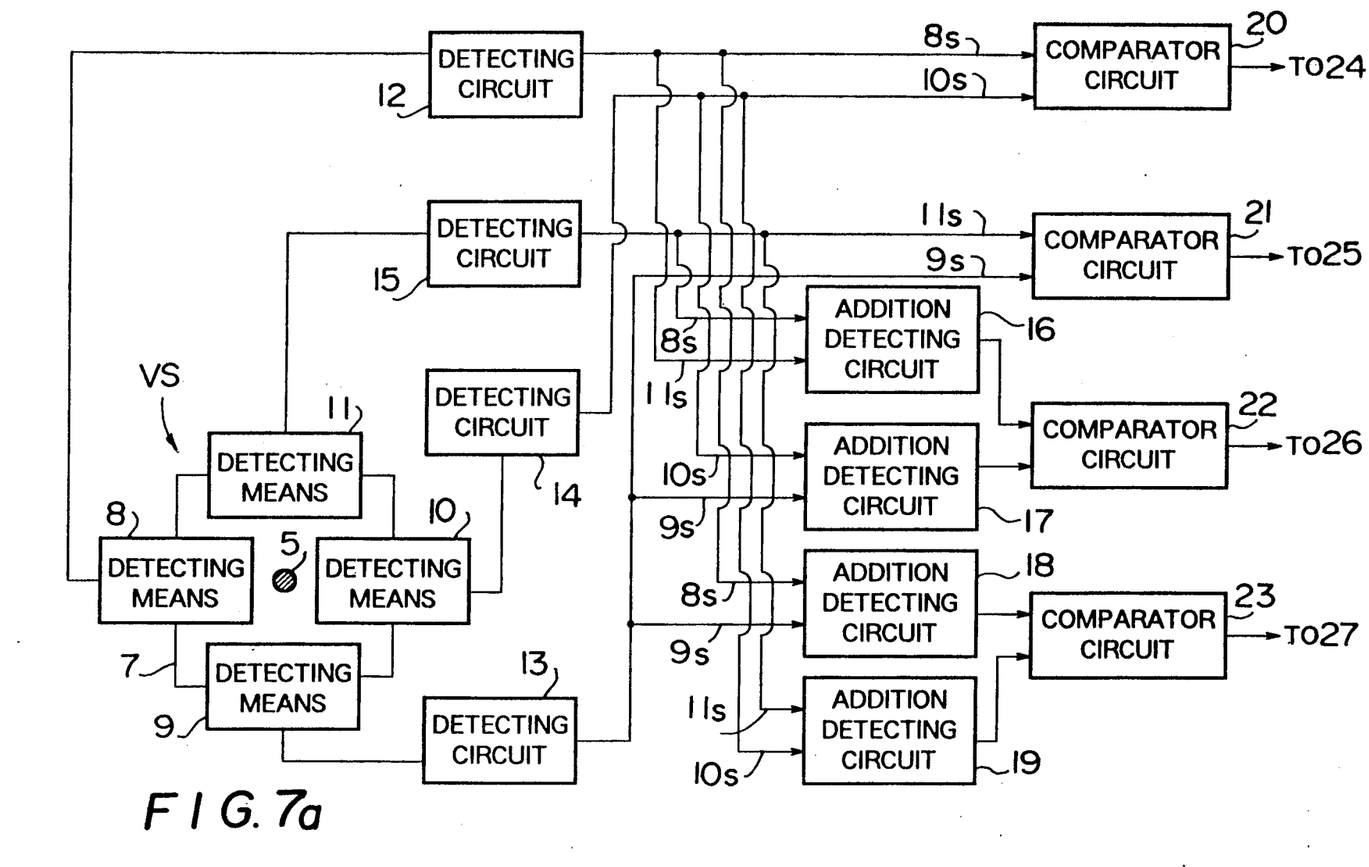
FIGS. 7A and 7B is block diagram which illustrates the operation of controlling the inclination of the level maintaining base shown in FIG. 6.
Figure 7B:
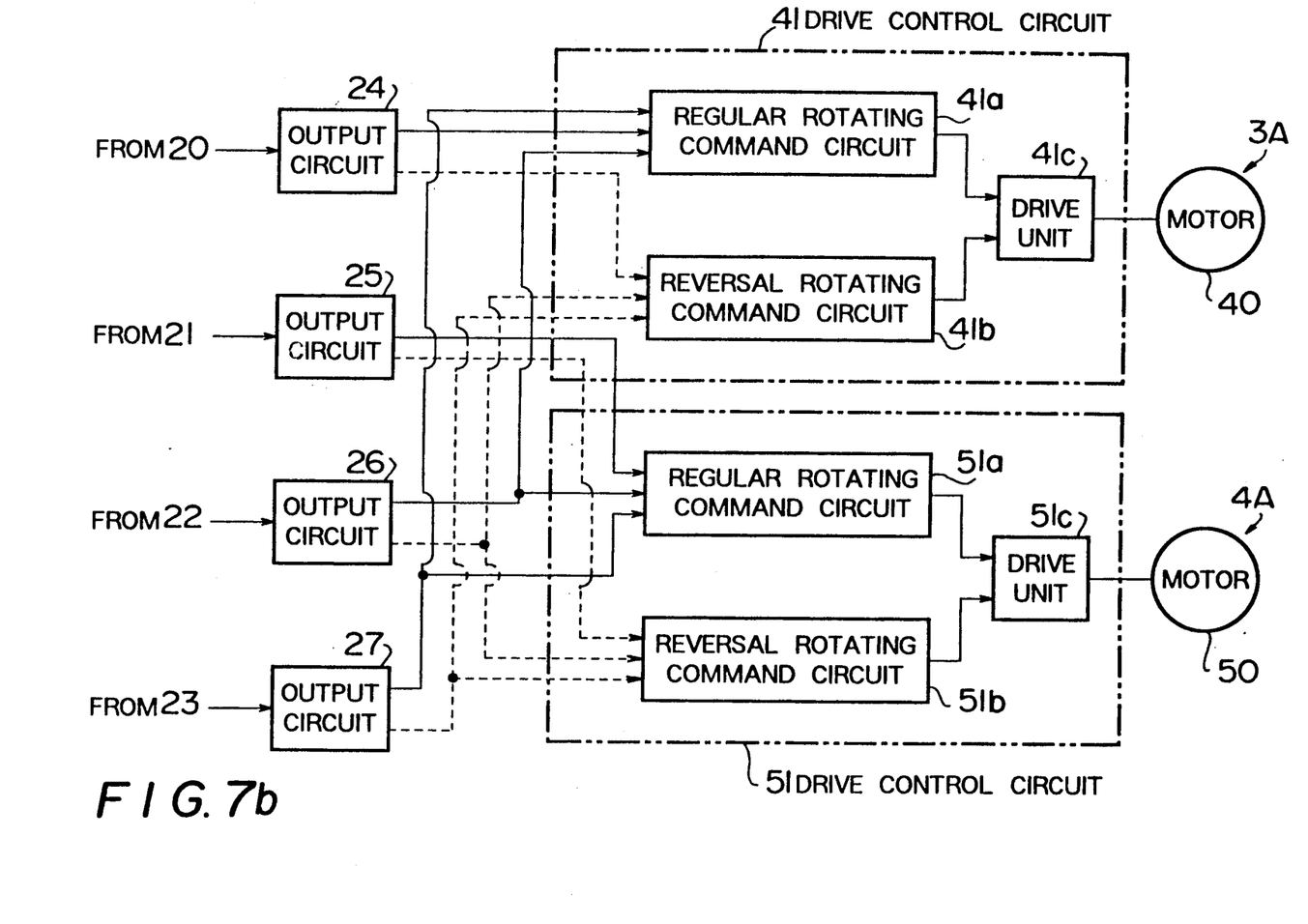

Referring to FIG. 7A and/or B, reference numerals 5 to 27 represent the same elements as those shown in FIG. 5. As a result, a signal denoting the angle and converted by the output circuits 24 to 27 is transmitted.

Thus, as will be described below, the verticality detector VS is applied to a mechanism for always horizontally maintaining the reference horizontal plane H including the shafts 29 and 29' with respect to the vertical axis by lifting the stroke actuators 30A and 31A of the third shaft 30 and the fourth shaft 31 of the level maintaining base according to the present invention and shown in FIG. 6.

If the reference horizontal plane H including the shafts 29 and 29' of the level maintaining base according to the present invention is inclined with respect to the vertical axis while being deviating from the level, the cylindrical main body of the detector VS is also inclined while making the same angle.

The inclination is detected by one or two detection means selected from the detections means 8 to 11 included in the cylindrical main body 1. The inclination thus detected is then processed by the portion shown in FIG. 7A and /or 7B and arranged to process the detection signal so that it is supplied to rotation control circuits 41 and 51 for motors 40 and 50 for the actuators 30A and 31A. As a result, the motors 40 and 50 are rotated forwards or rearwards so that the attitude of the cylindrical main body 1 is corrected vertically. In order to make the description easier, the forward rotation of each of the motors 40 and 50 is arranged clockwise, while the rearward rotation of the same is arranged counterclockwise. Then, the rotation of the motors 40 and 50 will be described below.

The output circuit 24 of the detection signal processing portion of the detection means transmits a forward-rotation signal or a rearward-rotation signal for rotating the motor 40 in accordance with the output from the detection means 8 and 10. Similarly, the output circuit 25 transmits a forward-rotation signal or a rearward rotation signal for rotating the motor 50 in accordance with the outputs from the detection means 9 and 11.

On the other hand, the output circuit 26 transmits a forward-rotation signal or a rearward rotation signal for rotating the motors 40 and 50 in accordance with the outputs from the detection means 8, 11 and 9, 10. Similarly, the output circuit 27 transmits a forward-rotation signal or a rearward rotation signal for rotating the motors 40 and and 50 in accordance with the outputs from the detections means 8, 9 and 10, 11.

The combination of the signals denoting the rotational direction of the motors 40 and 50 and transmitted from the output circuits 26 and 27 may be varied, the specific description of the combination being omitted here.

The control circuits 41 and 51 for the motors 40 and 50 respectively comprise forward-rotation instruction circuits 41a and 51a, rearward-rotation instruction circuits 41b and 51b and operating portions 41c and 51c for the respective motors 40 and 50.

As a result, in response to the signals obtainable from the detection means 8 to 11, signals for controlling the motors 40 and 50 which act to always vertically correct the cylindrical main body 1 can be obtained.

As described above, in the level maintaining base according to the present invention, the inclination of the reference member (the cylindrical main body) with respect to the vertical axis can be quantitatively detected. Therefore, the inclination of the above-described reference member can be corrected in response to the detection signal. As a result, the attitude of the reference horizontal plane H including the two shaft 29 and 29' can be always corrected so that it can be held horizontally with respect to the vertical axis.

The above-described description is made about a structure capable of always maintaining the reference horizontal plane H of the level maintaining base according to the present invention if the surface on which the horizontal maintaining base is mounted is angularily deviated. However, the level maintaining base according to the present invention may be arranged in such a manner that the reference horizontal plane H follows the direction and the angular degree of the optional inclination so as to maintain its angle.

As described above, the level maintaining base according to the present invention acts to maintain the reference horizontal plane H at horizontal level regardless of the displacement of the surface on which the level maintaining base is mounted or acts to always maintain a predetermined angle. Therefore, an excellent effect can be obtained in the following field.

For example, a cargo handling device having a horizontally rotational arm and mounted on a cargo truck encounters a problem in terms of an undesired action of the arm if the rotational axis of the rotational arm is inclined. Therefore, the level maintaining base according to the present invention can be employed in a mechanism for always maintaining the rotational axis vertical. Then, an example of the structure of the type described above will be described in detail with reference to FIGS. 8 to 10.

Figure 8:
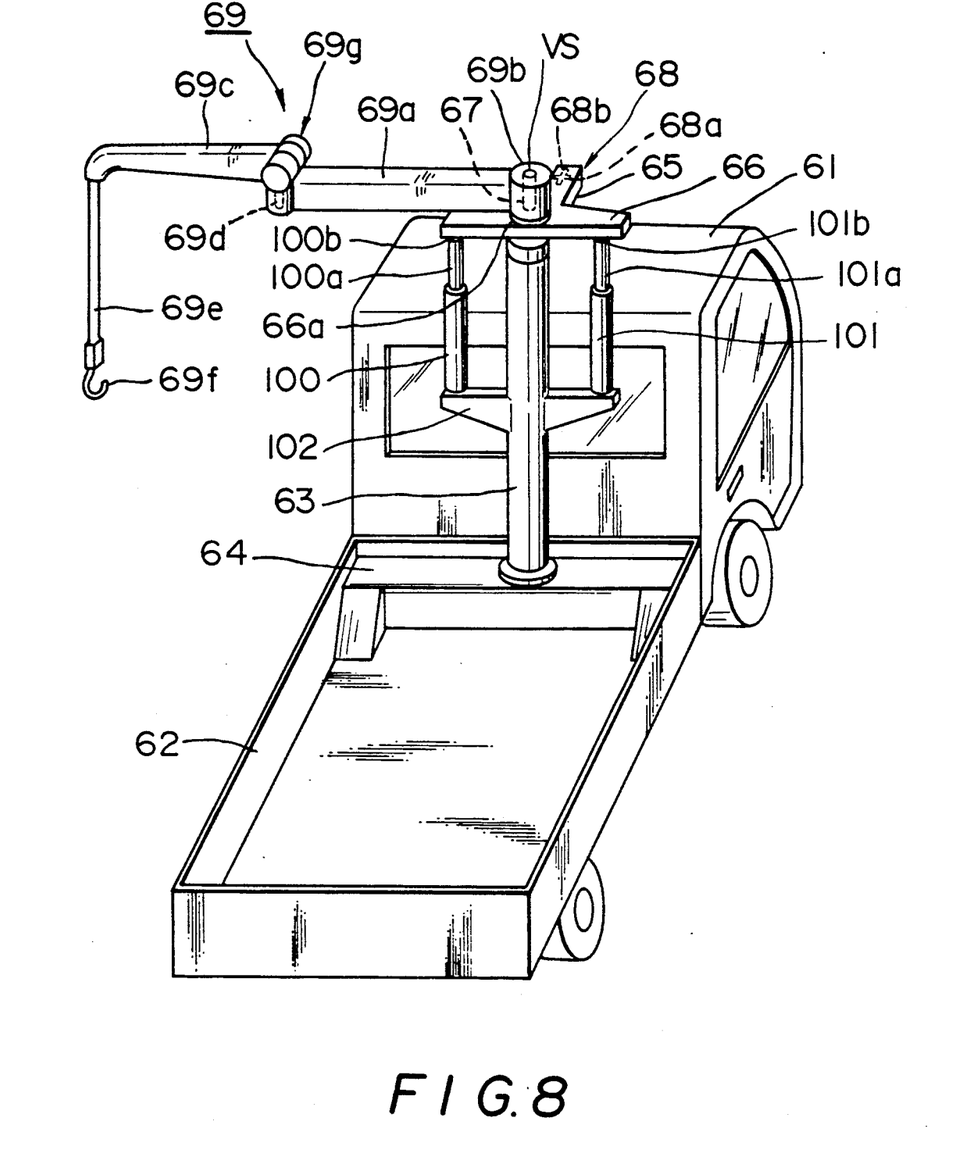
FIG. 8 is a perspective view which illustrates, from the rear portion, a cargo truck on which a cargo handling device is mounted, the cargo handling device having a horizontal attitude maintaining/adjustment mechanism according to a modification to the level maintaining base to which the detector according to the present invention is applied.

Reference numeral 61 represents a cabin of a cargo truck, 62 represents a box-like load carrying platform disposed behind the cabin 61 and 63 represents a support member such as a pole and made of pipe according to this example.

Reference numeral 64 represents a support member fastening base for vertically fastening the support member 63 to the load-carrying platform 62 so that the support member 63 is erected from the substantially central portion of the rear surface of the cabin 61 according to this example. The support member 63 to be erected may be arranged to be a telescopic structure so that its height can be changed.

Reference numeral 65 represents a support bracket fastened to the top end of the support member 63 in such a manner that the support bracket 65 extends on the top surface of the cabin 61. Reference numeral 66 represents a fastening member manufactured from a steel plate having a proper thickness and in the form of a substantially inverted T-shape when viewed in a plan view. The front end portion of the fastening member 66 is connected to the front portion of the bracket 65 by, for example, a universal joint 68. As a result, the fastening member 66 is arranged to be freely inclined back and forth and right and left with respect to the support bracket 65.

Reference numeral 67 represents a rotational shaft vertically fastened to the top surface of the central portion 66a of the fastening member 66 on this side of the drawing. The rear end portion of a first arm member 69a of a cargo handling device 69 to be described later is fastened to the rotational shaft 67.

Figure 9:
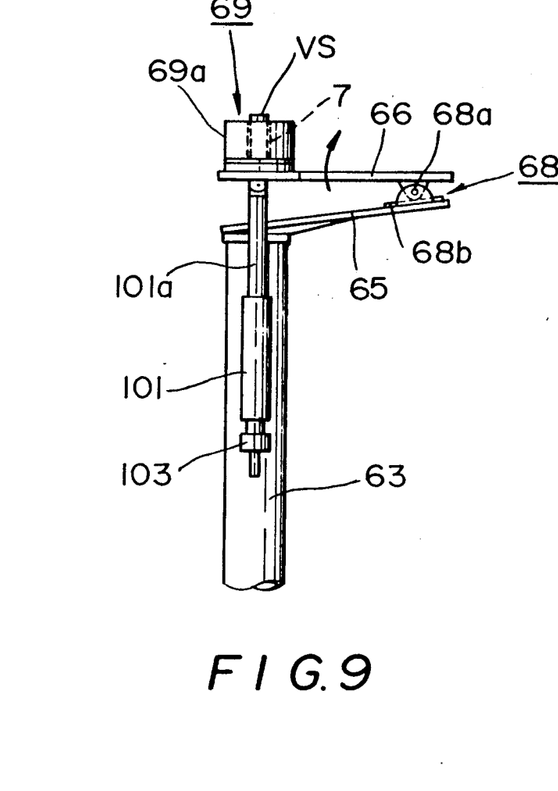
FIG. 9 is an upper side elevational view which illustrates the cargo handling device.

Reference numeral 69 represents a cargo handling device of the type arranged in such a manner that the arm rotates in the plane. The above-described first arm member 69a of the cargo handling device 69 is arranged in such a manner that a hinge 69b is formed in the rear end portion of the first arm member 69a. As a result of the action of the hinge 69b, the first arm member 69 can be rotatably fastened to a vertical shaft 67 serving as the rotational shaft. Reference numeral 69c represents a second arm member of the cargo handling device 69, the second arm 69c being connected to the front end portion of the first arm member 69a via a vertical shaft 69d.

Reference numeral 69e represents a belt serving as a rope member hung from the front end portion of the second arm member 69c. Reference numeral 69f represents a cargo support member such as a hook and 69g represents a winding mechanism for winding up/down the belt 69e serving as the rope member, the winding mechanism 69g being disposed in the rear end portion of the second arm member 69c. The winding mechanism 69g comprises decelerator and a winding drum.

Although the above-described cargo handling device 69 comprises two arm members 69a and 69c, it may comprise one or three or more arm members. Furthermore, the arm member may be in the form of a telescopic structure so that it can be contracted/extended as desired. The telescopic arm member can be conveniently used at the time of handling the cargo since the range in which the cargo can be moved on the place can be optionally elongated and shortened.

As a result of the action of the universal joint 68 disposed at the front end portion of the support bracket 65, the fastening member 66 can be optionally inclined back and forth and right and left. Therefore, the rotational shaft 67 can be inclined back and forth and right and left with respect to the vertical direction. As a result, the attitude of the cargo handling device can be optionally adjusted. That is, when the cargo carrying platform 62 is inclined back, forth, right or left, the support member 63 is inclined back and forth or right and left from the vertical direction. Therefore, the inclination of the cargo handling device 69 can be prevented by maintaining the attitude of the fastening member 66 horizontal, that is, by vertically holding the rotational shaft 67.

Figure 10:
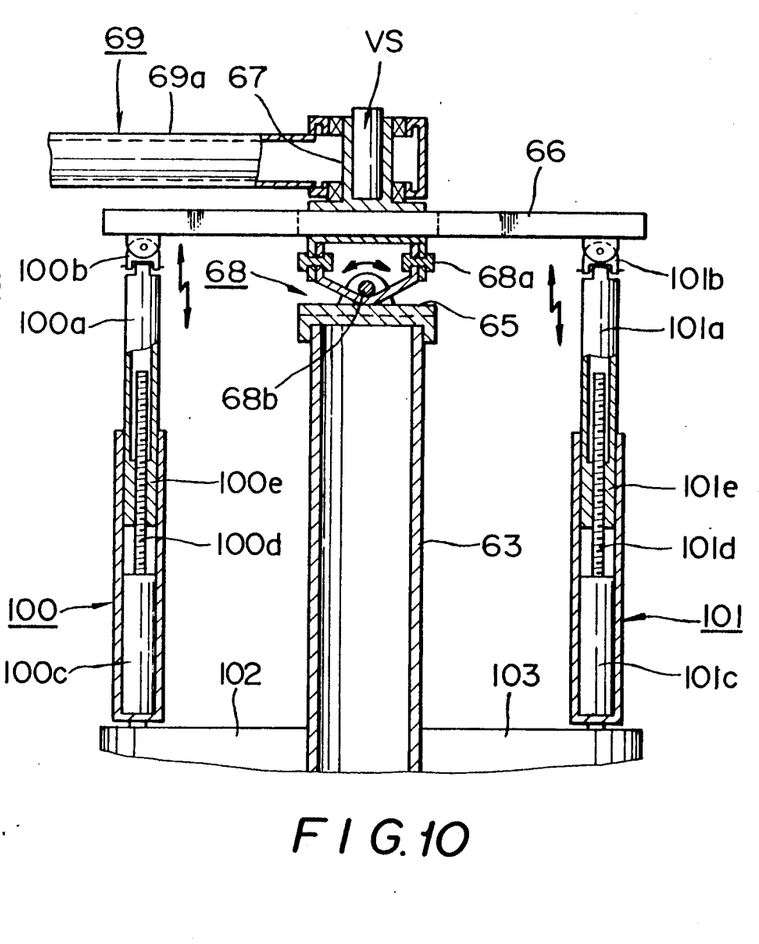
FIG. 10 is a front elevational view which illustrates an essential portion of the horizontal attitude adjustment mechanism shown in FIG. 8 and from which a portion is cut.

Then, the structure of a horizontal attitude adjustment mechanism according to a modification to the level maintaining base employing the detector VS according to the present invention and constituted from the above-described view point will be described with reference to FIGS. 9 and 10.

Reference numerals 100 and 101 respectively represent motor cylinders in which respective rods 100a and 101a stroke therein. The lower end portions of the cylinders 100 and 101 are erected on support members 102 and 103 which are respectively extended to the right and left at the intermediate portion of the support member 63. The front end portions of the rods 100a and 101a are fastened to the lower right and lower left surfaces on this side of the fastening member 66 via universal joints 100b and 101b. Referring to the drawings, reference numerals 100c and 101c represent motors, 100d and 101d represent drive screws and 100e and 101e represent nuts for the rods 100a and 101a.

As a result, when the rods 100a and 101a of the motor cylinders 100 and 101 are simultaneously and by the same degree, moved upwardly/downwards, the fastening member 66 is vertically swung relative to a lateral horizontal shaft 68a of the universal joint 68. Furthermore, when the rods 100a and 101a are respectively moved upwards/rearwards or rearwards/upwards, the fastening member 66 is swung right and left relative to a longitudinal horizontal shaft 68b of the universal joint 68, the fastening member 66 being swung as described above with respect to the support member 63.

Another structure may be employed as an alternative to the structure in which the motor cylinders 100 and 101 are employed, the structure being arranged in such a manner that the shafts 68a and 68b of the universal joint 68 may be angularily moved by the output of the rotation of a rotational actuator such as a motor (omitted from illustration).

As a result, according to the present invention, the verticality of the rotary shaft 67 can be adjusted by inclining the fastening member 66 back and forth and right and left on the load carrying platform 62.

The verticality of the rotational shaft 67 can be detected by a verticality detector VS disposed coaxially with the shaft 67 and the operation of each of the motor cylinders 100 and 101 is controlled by the output from the detector VS.

Furthermore, the base according to the present invention may be employed in a device arranged in such a manner that the base is fastened to a car of an outdoor working machine having catapillars or wheels and a crane-like load supporting means, which uses a parallel link in the form of a pantograph, is fastened to the reference horizontal surface of the base. In addition, it may be used as a mounting base device on which an artificial satellite tracing antenna is mounted, as the mounting base device on which a working machine of a movable working vehicle is mounted, as the mounting base device on which a machine of a marine vessel or an aircraft is mounted. As a result, inclination ranged from horizontal to a desired angular degree can be, as described above, realized on the reference horizontal plane of the mounting base device.

As described above, the structure according to the present invention is arranged in such a manner that the swing of the weight hung in the reference member such as the cylindrical main body and generated due to the inclination of the reference member in a certain direction is converted into vibrations. The vibrations thus obtained are detected by four or more detection means so that detection outputs are transmitted. The detection outputs are analyzed so that the existence, the direction and the degree of the inclination of the reference member can be quickly and accurately detected.

Therefore, the method and the detector according to the present invention is able to easily, accurately and quickly detect the verticality of a subject even if the subject to which the detector according to the present invention is fastened moves or swung itself. Therefore, the method and the detector according to the present invention can be widely employed in a variety of fields.

Furthermore, according to the level maintaining base according to the present invention, a mounting base on which a mechanism or a device is mounted can be arranged in such a manner that its angle can be maintained or changed with following a desired angle of the inclination including zero degree with respect to the vertical axis or the horizontal plane which is perpendicular to the vertical axis. Therefore, the level maintaining base according to the present invention can be preferably employed as the mounting base for a precise machine, a measuring machine, a communication parabola antenna or the like which must be precisely mounted in terms of the mounting angle (surface).

As for the angular correspondence to the above-described desired angle can be realized by forwards/rearwards operating the stroke actuator which supports the reference horizontal plane H of the mounting base according to the present invention in accordance with the angle detected by the angle detection sensor such as the verticality detector. Therefore, an automatic angle adjustment can be easily and quickly performed with saving labor. In addition, the mechanism capable of realizing the above-described operation can be significantly simply established. Therefore, a level maintaining base with which a significantly precise operation can be performed can be manufactured with a reduced overall cost.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A method of detecting verticality comprising the steps of:

hanging a weight from a reference member disposed along a vertical axis in a state where said weight can be freely swung forwards and rearwards and right and left;

detecting, in the direction of swinging of said weight, the state where said weight is swung when said weight is freely swung, said state being detected by proper detection means such as electric, magnetic or optical detection means;

analyzing a detection signal denoting the detected direction of the swing, whereby the inclination of said reference member with respect to the vertical axis is detected; and positioning a spring between said weight and said reference member so that friction therebetween may be reduced when said weight swings freely.

2. A method of detecting verticality according to claim 1, wherein said detection signal is analyzed in such a manner that, if said signals transmitted from said detection means are the substantially same in said forward and rearward directions or in said right and left direction, it is determined that said reference member is not inclined forwards or rearwards or right and left with respect to the vertical axis, while, if there if a deviation in said detection signals, it is determined that said reference member is inclined.

3. A method of detecting verticality according to claim 2, wherein said inclination of said reference member with respect to the vertical axis is detected in such a manner that the existence and/or direction and the degree of said inclination is detected in accordance with said output from said detection means.

4. A method of detecting verticality according to claim 2, wherein said output obtainable from said detection means is analyzed by making a comparison between the levels of said detection outputs which confront each other in said direction of swinging of said weight.

5. A method of detecting verticality according to claim 2, wherein said detection outputs from said detection means are in the form of pulse signals.

6. A method of detecting verticality according to claim 1, wherein said inclination of said reference member with respect to the vertical axis is detected in such a manner that the existence and/or the direction and the degree of said inclination is detected in accordance with said output from said detection means.

7. A method of detecting verticality according to claim 1, wherein said output obtainable from said detection means is analyzed by making a comparison between the levels of said detection outputs which confront each other in said direction of swinging of said weight.

8. A method of detecting verticality according to claim 1, wherein said detection outputs from said detection means are in the form of pulse signals.

9. The method according to claim 1, further comprising the steps of using said detection signal to control the operation of a rotational actuator for a first shaft and a second shaft of a base member or a stroke actuator for a third shaft and fourth shaft.

10. A verticality detector comprising:
longitudinally disposed cylindrical main body serving as a reference member;
a weight capable of freely swinging forwards and rearwards and right and left is hung in said cylindrical main body via a suspension support body;
detection means for electrically, magnetically or optically detecting swinging of said weight in the direction of swinging of said weight; and
means for applying an external force such as an elastic force of a spring or magnetic force so that swinging of said weight is enhanced or continued.

11. A verticality detector according to claim 10, wherein friction at a point at which said weight is hung and supported is reduced by interposing a spring.

12. A verticality detector according to claim 10, wherein the vertical position of said weight is adjustable for the purpose of adjusting the swinging frequency of said weight and wherein said detection means is positioned near the lower end portion of said suspension support body for improving the detection sensitivity.

13. A verticality detector according to claim 10, wherein, when said weight is stably positioned in the substantially vertical direction or when said weight swings without deflection forwards or rearwards or right or left with respect to the vertical axis, no output is generated in each of said detection means or an insensitive zone is provided in which the outputs from the confronting detection means are compensated for each other.

14. A level maintaining base for a mechanism or an apparatus comprising:
a base member on which a proper mechanism or an apparatus is mounted and end portions of which are supported via a horizontal first shaft and a horizontal second shaft disposed perpendicularly to said first shaft in such a manner that said base member can be swung relative to said two shafts;
third and fourth shafts capable of moving upwards/downwards and arranged to support end portions of said base member; and
a verticality detector comprising,
a main body carried by said base member so as to move therewith,
a support body for suspending a free-swinging weight from said main body,
detection means for detecting movement of said weight and for providing a detection output indicative of the levelness of said base member, and
spring means for reducing the friction between said support body and said main body; wherein
the operations of said first and second shafts and those of said third and fourth shaft are controlled responsive to said detection output.

15. A level maintaining base according to claim 14, wherein said third and fourth shafts are arranged to be moved upwards/downwards by a stroke actuator such as a motor cylinder.

16. A level maintaining base according to claim 14, wherein said first and second shafts are given rotational force from a rotational actuator such as a geared motor.

17. A verticality detector comprising:
a reference member having support means carried thereby;
suspension means for suspending a weight from said support means so that said weight is adapted to swing freely when said reference member is not vertical, the swinging of said weight being affected by friction between said suspension means and said support means;
detection means for detecting swinging of said weight; and
spring means for improving the detection sensitivity of said detection means, said spring means being disposed with respect to said suspension means and said support means so that the friction therebetween is reduced.

18. The detector as defined in claim 17 further comprising adjustment means for improving the detection sensitivity of said verticality detector, said adjustment means allowing said weight to be suspended at an adjustable distance from said support means so that said weight swings with a frequency that may be adjusted to improve detection sensitivity.

19. The detector as defined in claim 17 further comprising means for selectively applying a force to cause said weight to swing.

* * * * *